US008249788B2

(12) United States Patent
Han et al.

(10) Patent No.: US 8,249,788 B2
(45) Date of Patent: Aug. 21, 2012

(54) INFORMATION METHOD OF ECONOMICAL DRIVING FOR MANUAL TRANSMISSION VEHICLE

(75) Inventors: Kwonhee Han, Gunpo-si (KR); Hyeonsoo Kim, Suwon-si (KR); Dongjin Shin, Seoul (KR); Sungyun Kim, Jeju-do (KR); Kyuho Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 531 days.

(21) Appl. No.: 12/535,441

(22) Filed: Aug. 4, 2009

(65) Prior Publication Data

US 2010/0036571 A1 Feb. 11, 2010

(30) Foreign Application Priority Data

Aug. 8, 2008 (KR) ........................ 10-2008-0077807

(51) Int. Cl.
*G06F 7/00* (2006.01)

(52) U.S. Cl. ........................................................ 701/64

(58) Field of Classification Search .............. 701/51–53, 701/55–57, 64, 67; 180/170–171, 335
See application file for complete search history.

(56) References Cited

U.S. PATENT DOCUMENTS 4,651,593 A * 3/1987 Aoki et al. ...................... 477/65
4,875,454 A * 10/1989 Okimoto et al. ........... 123/559.3
5,335,743 A * 8/1994 Gillbrand et al. ............. 180/178
6,125,314 A * 9/2000 Graf et al. ....................... 701/53

FOREIGN PATENT DOCUMENTS

| | | | |
|---|---|---|---|
| JP | 9-287656 | A | 11/1997 |
| JP | 11-311332 | A | 11/1999 |
| JP | 2000-272458 | A | 10/2000 |
| JP | 2001-163225 | A | 6/2001 |
| JP | 2003-220851 | A | 8/2003 |
| JP | 2006-256502 | A | 9/2006 |
| JP | 2007-106195 | A | 4/2007 |
| JP | 2007-315535 | A | 12/2007 |
| KR | 10-0462507 | B1 | 12/2004 |
| KR | 10-0530135 | B1 | 11/2005 |

* cited by examiner

*Primary Examiner* — Yonel Beaulieu
(74) *Attorney, Agent, or Firm* — Morgan, Lewis & Bockius LLP

(57) ABSTRACT

The present invention relates to an information method for a manual transmission vehicle that provides information for inducing stepping on an accelerator pedal for economical driving of a manual transmission vehicle and provides information for inducing changing a shift stage for the economical driving by using a driving performance guidance map showing a fuel consumption rate area in accordance with BSFC.

6 Claims, 3 Drawing Sheets

INFORMATION METHOD OF ECONOMICAL DRIVING FOR MANUAL TRANSMISSION VEHICLE

CROSS-REFERENCE TO RELATED APPLICATIONS

The present application claims priority to Korean Application Number 10-2008-0077807, filed on Aug. 8, 2008, the entire contents of which is incorporated herein for all purposes by this reference.

BACKGROUND OF THE INVENTION

1. Field of the Invention

The present invention relates to an information method of economical driving for a manual transmission vehicle, and more particularly, to an information method for a manual transmission vehicle that provides information for inducing stepping on an accelerator pedal for economical driving of a manual transmission vehicle and provides information for inducing changing a shift stage for the economical driving by using a driving performance guidance map showing a fuel consumption rate area in accordance with BSFC.

2. Description of Related Art

Brake Specific Fuel Consumption (BSFC) is a value acquired by dividing fuel consumption rate consumed per hour by work rate and is an index for measuring efficiency of an engine. FIG. 1 shows a BSFC map. BSFC in accordance with engine RPM and engine torque and accelerator pedal opening rate in accordance with BFSC at specific engine RPM and specific engine torque are displayed in the BSFC map. The lower a value of the BFSC is, the higher the efficiency of the engine is.

In a known automatic transmission vehicle, the information for inducing stepping on the accelerator pedal for the economical driving is provided to a driver through a cluster of the vehicle by using the accelerator pedal opening rate in accordance with the BSFC at the specific engine RPM and the specific engine torque of the BSFC map to induce the driver to adequately step on the accelerator pedal, thereby improving the efficiency of the engine, thus, improving fuel consumption.

Providing the information for inducing adequately stepping on the accelerator pedal for the economical driving by using the accelerator pedal opening rate at the specific engine RPM and the specific engine torque of the BSFC map is also applied to a manual transmission vehicle.

However, the information for inducing stepping on the accelerator pedal for the economical driving may be provided by using the accelerator pedal opening rate in accordance with the BSFC at the specific engine RPM and the specific engine torque of the BSFC map, but the information for inducing changing the shift stage the most required for the economical driving in the manual transmission vehicle cannot be provided even by using the accelerator pedal opening rate in accordance with the BSFC at the specific engine RPM and the specific engine torque of the BSFC map.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY OF THE INVENTION

Various aspects of the present invention are directed to provide an information method for a manual transmission vehicle providing information for inducing stepping on an accelerator pedal for economical driving of a manual transmission vehicle and providing information for inducing changing a shift stage for the economical driving by using a driving performance guidance map showing a fuel consumption rate area in accordance with BSFC.

In an aspect of the present invention, the information method of economical driving for a manual transmission vehicle, may include the steps of, a) estimating a present gear stage by present engine RPM and present vehicle speed, b) designating shift stage change lines in a driving performance guidance map where a fuel consumption rate area in accordance with BSFC ("Brake Specific Fuel Consumption") is displayed in the driving performance guidance map, c) determining a present position of a vehicle in the driving performance guidance map, wherein the present position is determined by present torque and the present vehicle speed of the vehicle, d) calculating fuel consumption rate when the vehicle changes a present shift stage to an upper stage or a lower stage, e) judging whether or not the fuel consumption rate is improved at the time of changing the present shift stage to the upper stage or the lower stage, and f) providing information for inducing the present shift stage to be changed to the upper stage or the lower stage if the fuel consumption rate is improved at the time of changing the present shift stage to the upper stage or the lower stage.

The step of designating the shift stage change lines may include the steps of, connecting a start point of a specific fuel consumption rate area of stage n+1 with an end point of a specific fuel consumption rate area of stage n to form a shift stage change line, wherein the start point forms a minimum vehicle speed of the stage n+1 and the end point forms a minimum vehicle speed of the stage n, and designating a vertical line extending vertically downwards from a point intersected by a minimum torque line (TPS) in each stage and the shift stage change line in each stage.

Designating the minimum and maximum vehicle speeds may further include the steps of, modifying the minimum vehicle speed according to a vehicle speed considering a position slope of the vehicle and a minimum vehicle speed for driving the vehicle at a shift stage to be changed, and modifying the maximum vehicle speed at the end point of the specific fuel consumption rate area of stage n as a maximum vehicle speed by considering fuel consumption instead of acceleration.

In another aspect of the present invention, the information method may further include the steps of, designating an green zone, which maintains constant speed in a BSFC map, wherein the green zone is enclosed by optimal operation lines (OOL), the TPS lines, and the vertical lines, and providing information for inducing a change of the present vehicle speed to allow the present vehicle speed to be positioned within the green zone when the present vehicle speed is positioned outside the green zone, and providing information for inducing the present vehicle speed to be changed to allow the present vehicle speed to be positioned within the green zone when the present vehicle speed moves toward the outside of the green zone by changing the present vehicle speed which is positioned within the green zone through a cluster.

The information method may further include the step of, checking whether a back-up lamp switch is on or a clutch pedal switch is on before the step of a), wherein the steps a) to f) are not executed if the back-up lamp switch is on or the clutch pedal switch is on, wherein the steps a) to f) are executed if the back-up lamp switch is not on and the clutch pedal switch is not on.

In further another aspect of the present invention, the information in the step f) of providing information may be transferred via a cluster of the vehicle.

An information method of economical driving for a manual transmission vehicle according to an embodiment of the present invention improves fuel consumption by illustrating a shift stage change line in a driving performance guidance map showing a fuel consumption rate area in accordance with BSFC and providing information for inducing changing a shift stage into a proper shift stage in accordance with vehicle speed and vehicle torque.

An information method of economical driving for a manual transmission vehicle according to another embodiment of the present invention further improves fuel consumption by designating an area having the minimum accelerator pedal opening rate or less for maintaining constant speed in a BSFC map as a green zone and inducing constant speed driving by providing information for inducing a change of vehicle speed to allow the vehicle speed to be positioned in the green zone in the case when the vehicle speed is positioned outside the green zone.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

Figure 1:
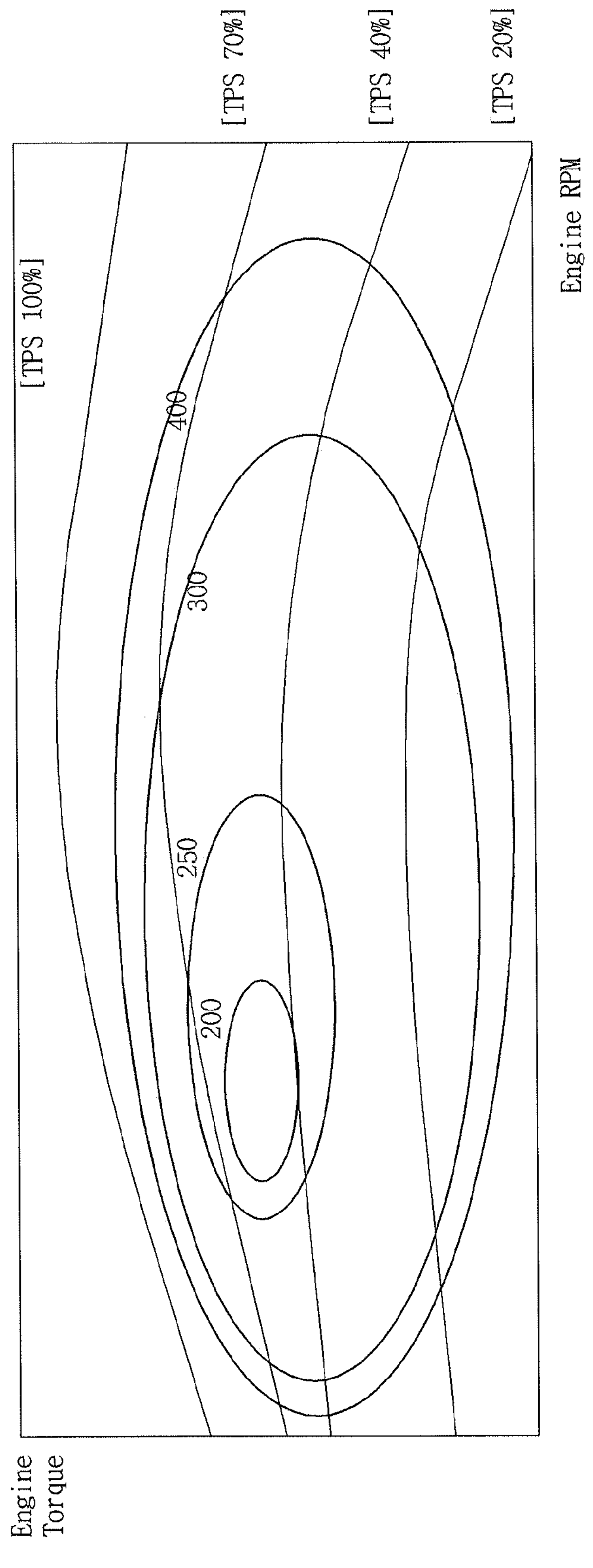
FIG.1 (Prior Art)
FIG. 1 illustrates an example of a BSFC map.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Hereinafter, various exemplary embodiments of the present invention will be described with reference to FIGS. 2 to 3.

Adequate shift stages (stage 1 to stage 4) in accordance with vehicle speed and vehicle torque are displayed in a general driving performance guidance map.

Figure 2:
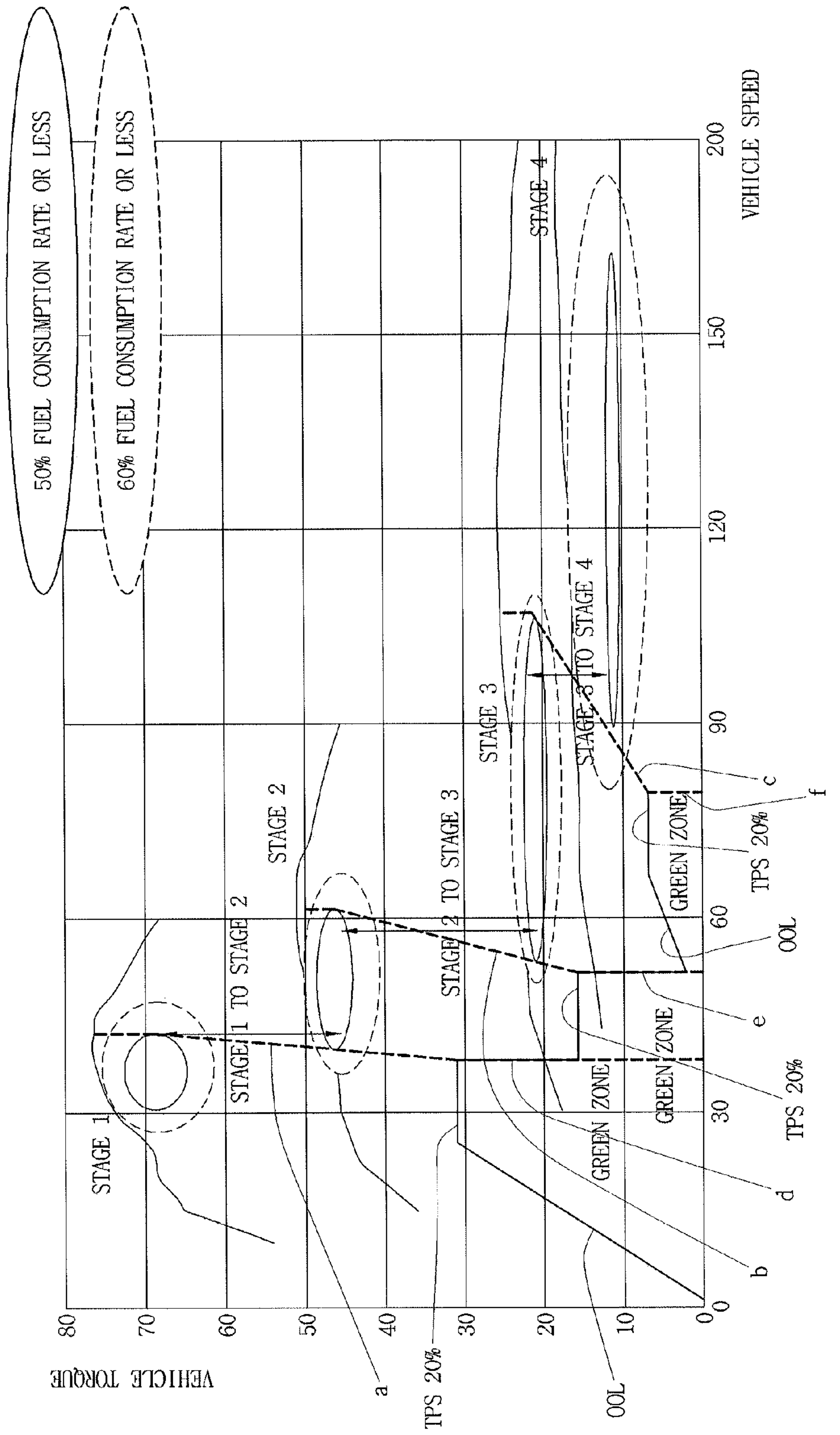
FIG. 2 illustrates fuel consumption rate in accordance with BSFC in a driving performance guidance map according to an exemplary embodiment of the present invention.
Figure 3:
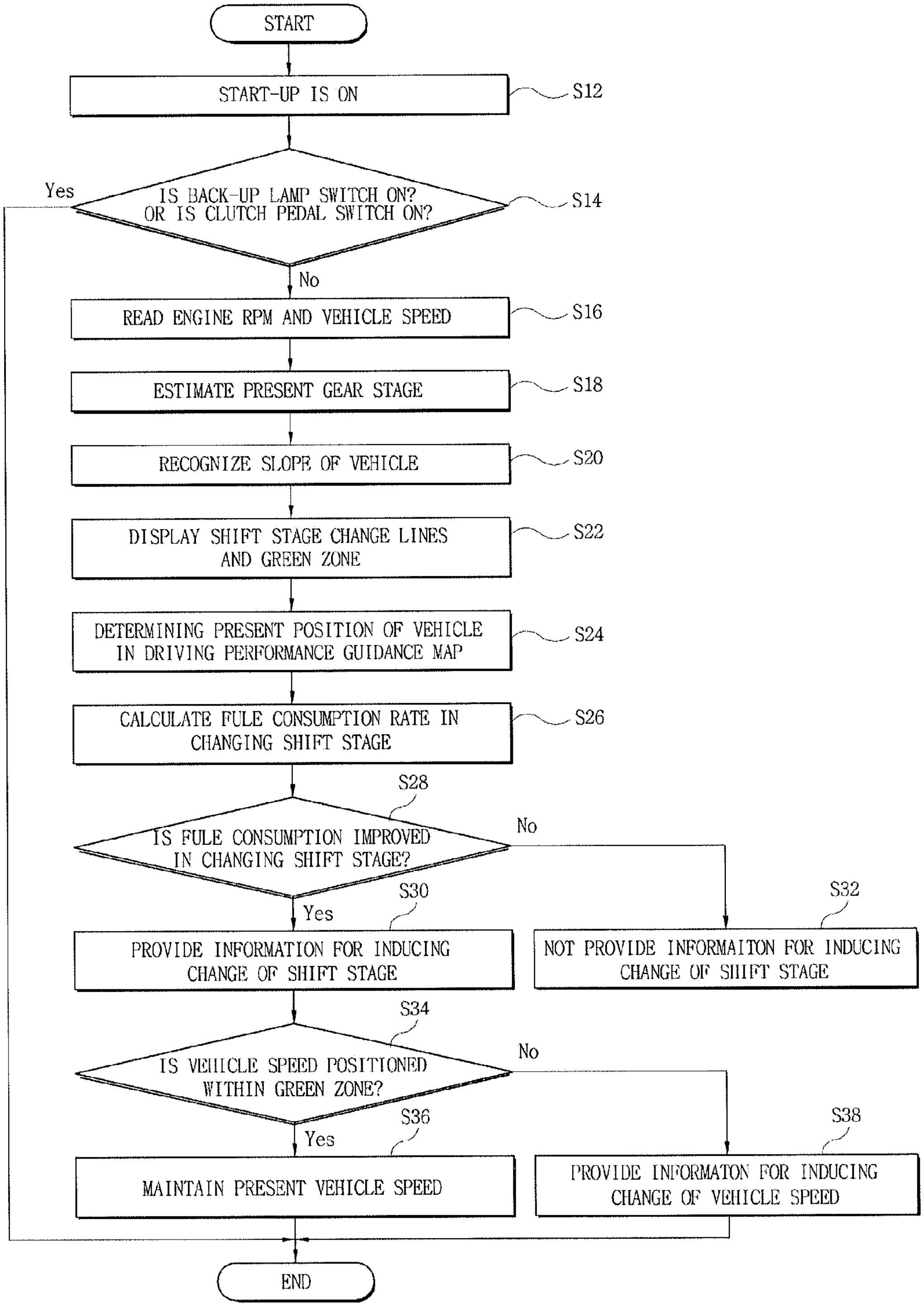
FIG. 3 is a flowchart illustrating an information method of economical driving of a manual transmission vehicle according to an exemplary embodiment of the present invention.

However, referring to FIG. 2, in a driving performance guidance map according to an exemplary embodiment of the present invention, a fuel consumption rate area in accordance with BSFC is displayed in a driving performance guidance map showing the proper shift stages (stage 1 to stage 4) in accordance with the vehicle speed and the vehicle torque.

The vehicle speed is acquired by multiplying engine RPM by a transmission ratio and the vehicle torque is calculated by the engine torque. Therefore, it will be apparent to those skilled in the art that the fuel consumption rate area in accordance with the BSFC is displayed in the driving performance guidance map.

In an information method of economical driving for a manual transmission vehicle according to an exemplary embodiment of the present invention, shift stage change lines (a to c) acquired by connecting a start point of a specific fuel consumption rate area of stage n+1 with an end point of a specific fuel consumption rate area of stage n are displayed in the driving performance guidance map wherein the fuel consumption rate area in accordance with the BSFC is displayed.

For example, a shift stage change line b acquired by connecting a start point of a 50% fuel consumption rate area of stage 3 with an end point of a 50% fuel consumption rate area of stage 2 is displayed in the driving performance guidance map where the fuel consumption rate area in accordance with the BSFC is displayed.

In brief, in the information method of economical driving for a manual transmission vehicle, the shift stage change lines (a to c) are designed by slant lines connecting the minimum vehicle speed (i.e., a start point of a specific fuel consumption rate of stage n+1) and the maximum vehicle speed (an end point of a specific fuel consumption rate of stage n).

Vertical lines (d to f) are defined as vertically extending lines from intersected points between a minimum torque line (for example, TPS 20%) and the shift stage change lines (a to c) at each stage. The minimum TPS is defined as a minimum torque value to keep the constant vehicle speed in each stage.

Optimal operation lines (OOL) may be designated a line showing the most efficient operation performance of the vehicle from the stationary state to a specific fuel consumption rate (for instance, 50%) in accordance with BSFC, which is determined by experiments.

Moreover, in the information method of economical driving for the manual transmission vehicle according to an exemplary embodiment of the present invention, an area enclosed by minimum TPS (for example, TPS 20%) or less, which maintains constant speed in a BSFC map, the vertical lines (d to f), and optimal operation line (OOL) is designated as a green zone.

In another exemplary embodiment of the present invention, the minimum vehicle speed of the shift stage change lines a to c may be modified by the position slope of the vehicle and a vehicle speed considering the minimum vehicle speed for driving the vehicle at a shift stage to be changed. Furthermore, the maximum vehicle speed of the shift stage change lines a to c may be modified by a vehicle speed of the end point of the specific fuel consumption rate of stage n by considering fuel consumption rather than acceleration.

The information method of economical driving for the manual transmission vehicle according to an exemplary embodiment of the present invention provides information for inducing the shift stage to be changed into a proper shift stage in accordance with vehicle speed and vehicle torque when the shift stage change lines a to c are displayed.

Information for inducing a change of vehicle speed to allow the vehicle speed to be positioned in the green zone in the case when the vehicle speed is positioned outside the green zone is provided.

In addition, even while the vehicle speed is positioned within the green zone, a driver can change the vehicle speed to further improve fuel consumption by providing the driver with the information for inducing the change of the vehicle speed so as to allow the vehicle speed to be kept within the green zone through a cluster of the vehicle.

Hereinafter, referring to FIG. 3, the information method of economical driving for the manual transmission vehicle according to the exemplary embodiment of the present invention will be described.

When start-up is on (S12), it is checked if a back-up lamp switch is on or a clutch pedal switching is on (S14). When the back-up lamp switch is on, the vehicle is under the back-up, such that the driver should not try to change the shift stage. When the clutch pedal switch is on, the driver tries to change the shift stage and thus the information for inducing the shift stage to be changed may not be provided.

Therefore, in step S14, when the back-up lamp switch is not on and the clutch pedal switch is not on, the engine RPM and the vehicle speed are read (S16), and thus a current gear stage is estimated (S18). The gear stage maybe estimated by a gear ratio and the gear ratio is acquired by dividing the vehicle speed by the engine RPM.

In step S18, when the current gear stage is estimated, the position slope of the vehicle is recognized (S20). The position slope of the vehicle may be recognized by a G sensor or may be recognized by an equation for estimating the position slope of the vehicle which is apparent to those skilled in the art.

Thereafter, in the information method of economical driving for the manual transmission vehicle, the shift stage change lines a to c and vertical lines d to f thereof (referring to FIG. 2) are displayed in the driving performance guidance map where the fuel consumption rate area in accordance with the BSFC is displayed (S22). In step S22, when the shift stage change lines a to c are displayed, a minimum vehicle speed point is determined by considering the position slope of the vehicle in step S22.

Subsequently, a present position of the vehicle in the driving performance guidance map is determined by current torque and speed of the vehicle (S24), and fuel consumption rate at the time of changing the present shift stage of the vehicle to an upper stage or a lower stage is calculated (S26).

When the fuel consumption rate is improved (S28) at the time of changing the present shift stage of the vehicle to the upper stage or the lower stage, information for inducing the shift stage to be changed to the upper stage or the lower stage is provided through the cluster (S30).

Meanwhile, when the fuel consumption rate is not improved (S28) at the time of changing the present shift stage to the upper stage or the lower stage, the information for inducing the shift stage to be changed to the upper stage or the lower stage is not provided through the cluster (S32).

In step 22, when the shift stage change lines a to c are displayed, the green zone is displayed therewith. It is judged whether or not the present vehicle speed is positioned within the green zone of the driving performance guidance map (S34).

If the present vehicle speed is positioned within the green zone of the driving performance guidance map, information for inducing the present vehicle speed to be maintained is provided through the cluster (S36), while if the present vehicle speed is not positioned within the green zone of the driving performance guidance map, the information for inducing the present vehicle speed to be maintained is not provided through the cluster (S38). Therefore, it is possible to further improve the fuel consumption by inducing the constant-speed driving.

For convenience in explanation and accurate definition in the appended claims, the terms "inside" and "outside" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the claims appended hereto and their equivalents.

What is claimed is:

1. An information method of economical driving for a manual transmission vehicle, comprising the steps of:

a) estimating a present gear stage by present engine RPM and present vehicle speed;

b) designating shift stage change lines in a driving performance guidance map where a fuel consumption rate area in accordance with BSFC ("Brake Specific Fuel Consumption") is displayed in the driving performance guidance map;

c) determining a present position of a vehicle in the driving performance guidance map, wherein the present position is determined by present torque and the present vehicle speed of the vehicle;

d) calculating fuel consumption rate when the vehicle changes a present shift stage to an upper stage or a lower stage;

e) judging whether or not the fuel consumption rate is improved at the time of changing the present shift stage to the upper stage or the lower stage; and f) providing information for inducing the present shift stage to be changed to the upper stage or the lower stage if the fuel consumption rate is improved at the time of changing the present shift stage to the upper stage or the lower stage;

wherein the step of designating the shift stage change lines includes the steps of:

connecting a start point of a specific fuel consumption rate area of stage n+1 with an end point of a specific fuel consumption rate area of stage n to form a shift stage change line, wherein the start point forms a minimum vehicle speed of the stage n+1 and the end point forms a minimum vehicle speed of the stage n; and designating a vertical line extending vertically downwards from a point intersected by a minimum torque line (TPS) in each stage and the shift stage change line in each stage.

2. The information method as defined in claim 1, wherein designating the minimum and maximum vehicle speeds further includes the steps of modifying the minimum vehicle speed according to a vehicle speed considering a position slope of the vehicle and a minimum vehicle speed for driving the vehicle at a shift stage to be changed; and modifying the maximum vehicle speed at the end point of the specific fuel consumption rate area of stage n as a maximum vehicle speed by considering fuel consumption instead of acceleration.

3. The information method as defined in claim 1, further comprising the steps of:

designating a green zone, which maintains constant speed in a BSFC map, wherein the green zone is enclosed by optimal operation lines (OOL), TPS lines, and vertical lines; and providing information for inducing a change of the present vehicle speed to allow the present vehicle speed to be positioned within the green zone when the present vehicle speed is positioned outside the green zone; and providing information for inducing the present vehicle speed to be changed to allow the present vehicle speed to be positioned within the green zone when the present vehicle speed moves toward the outside of the green zone by changing the present vehicle speed which is positioned within the green zone through a cluster.

4. The information method as defined in claim 1, further comprising the step of:

checking whether a back-up lamp switch is on or a clutch pedal switch is on before the step of a), wherein the steps a) to f) are not executed if the back-up lamp switch is on or the clutch pedal switch is on.

5. The information method as defined in claim 4, wherein the steps a) to f) are executed if the back-up lamp switch is not on and the clutch pedal switch is not on.

6. The information method as defined in claim 1, wherein the information in the step f) of providing information is transferred via a cluster of the vehicle.

* * * * *